United States Patent [19]

Justus

Best Available Copy

[11] E Re. 30,268

[45] Reissued May 6, 1980

[54] HYDRODYNAMICALLY LOADED WEB PRESS WITH SLIPPER BEARING SHOES

[75] Inventor: Edgar J. Justus, Beloit, Wis.

[73] Assignee: Beloit Corporation, Beloit, Wis.

[21] Appl. No.: 833,808

[22] Filed: Sep. 16, 1977

Related U.S. Patent Documents

Reissue of:

[64] Patent No.: 3,783,097
Issued: Jan. 1, 1974
Appl. No.: 258,103
Filed: May 30, 1972

[51] Int. Cl.[2] ..... D21F 3/04; D21F 3/06

[52] U.S. Cl. ..... 162/360 R; 100/121; 100/151; 100/153; 162/358

[58] Field of Search ..... 162/358, 360 R, 361, 162/205; 100/118, 120, 121, 151, 152, 153, 154, 161, 170, 211; 144/281 B

[56] References Cited

U.S. PATENT DOCUMENTS

| | | | |
|---|---|---|---|
| 2,281,860 | 5/1942 | Renault | 100/120 X |
| 2,909,804 | 10/1959 | Means | 100/151 X |
| 3,074,764 | 1/1963 | Bertelsen | 100/154 X |
| 3,293,121 | 12/1966 | Martin | 162/358 |
| 3,532,050 | 10/1970 | Carlsmith | 100/118 |

FOREIGN PATENT DOCUMENTS

| | | | |
|---|---|---|---|
| 79919 | 2/1971 | German Democratic Rep. | 162/358 |

*Primary Examiner*—Richard V. Fisher
*Attorney, Agent, or Firm*—Hill, Van Santen, Steadman, Chiara & Simpson

[57] ABSTRACT

A press mechanism for removing liquid from a traveling fibrous web such as a web of paper received from the fourdrinier section of a paper machine including a backing roll and a looped traveling belt forming a press nip with the roll with a plurality of shaped shoes extending the length of the roll and pressing the belt toward the nip with said shoes having a concave curved surface facing the belt and being pivotally supported so that a wedge of lubricating fluid builds up between each of the shoes and the belt to lubricate the shoes and to press the belt toward the nip. Means are provided for individually controlling the force with which the shoes are pressed toward the belt.

20 Claims, 3 Drawing Figures

Fig. 1
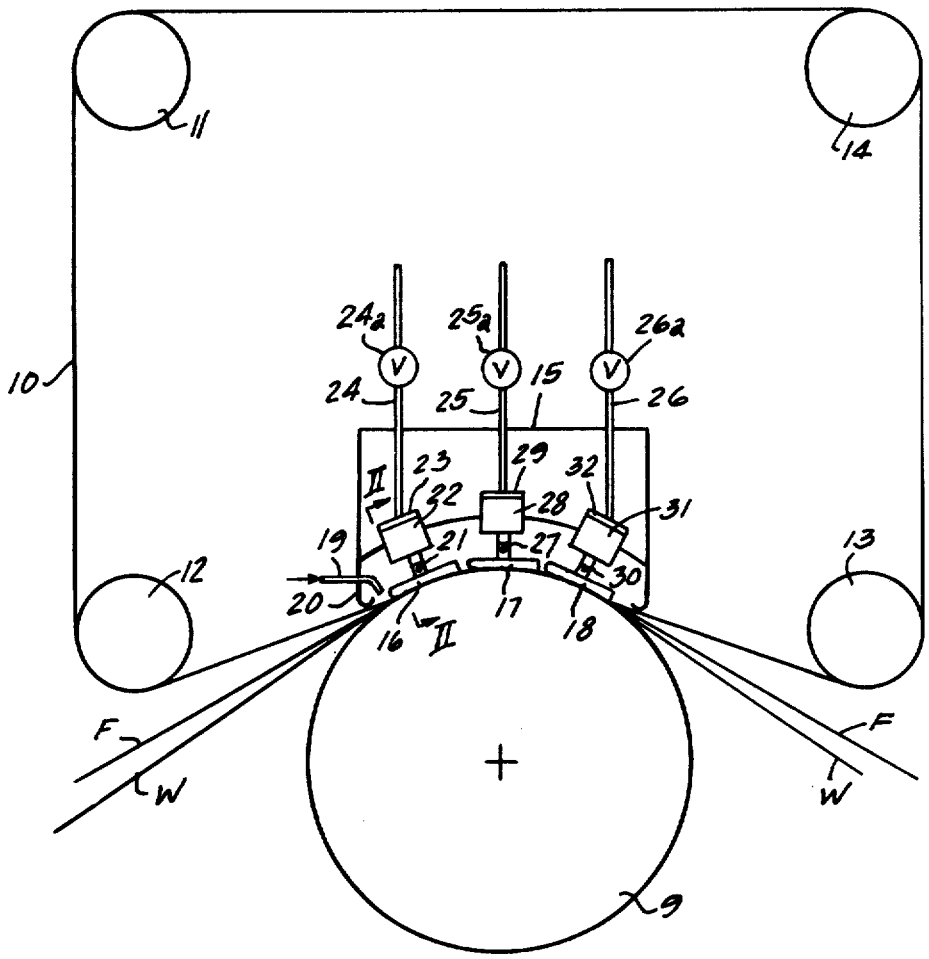
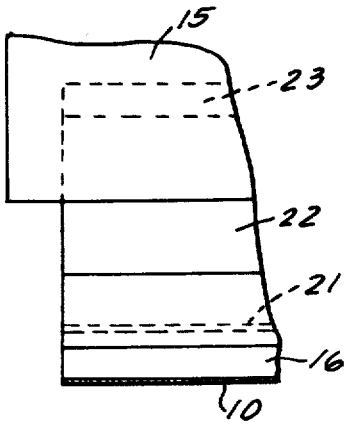
Fig. 2

HYDRODYNAMICALLY LOADED WEB PRESS WITH SLIPPER BEARING SHOES

Matter enclosed in heavy brackets [ ] appears in the original patent but forms no part of this reissue specification; matter printed in italics indicates the additions made by reissue.

BACKGROUND OF THE INVENTION

The invention relates to an improved extended nip press and more particularly to a pressing mechanism for extracting water from a traveling web which requires considerably less space and is capable of extracting more water from the web than has been heretofore possible with conventional press couples.

The present invention provides a pressing arrangement having a plurality of nips wherein the residence time of the web in the nips is increased over that of a roll couple and wherein a mechanically more compact structure is used. Attempts have been made to provide presses which provide for a greater pressing time and reduce the space required by the press, but a number of these have encountered disadvantages, and the present structure provides advantages over structures heretofore available.

As will be appreciated from the teachings of the disclosure, the features of the invention may be employed in the dewatering of other forms of webs than a paper web in a paper making machine. However, for convenience, a preferred embodiment of the invention will be described in the environment of a paper making machine which conventionally forms a web by depositing a slurry of pulp fibers on a traveling fourdrinier wire, transfers the web to a press section where the web passes through a number of press nips formed between roll couples, and the web then passes over a series of heated dryer drums and usually through a calendar and then is wound on the roll. The present structure forms the entire press section and takes the place of other forms of press sections heretofore available. Modifications can be made in the overall machine, as to the forming section, or the dryer section which can be accommodated by the instant invention. The structure of the instant disclosure also may be employed in pressing webs of various synthetic fibers.

The present invention relates to improvements for the press sections of a paper making machine. Because of various inherent limitations in the operation of roll couples forming press nips for the press section in a conventional paper making machine, only a given amount of water can be removed in each nip and, therefore, in a conventional paper making machine, a series of nips are usually employed. It has been found impractical to attempt to remove a significant amount of additional water by increasing the number of press nips, although the further removal of water by pressing can greatly reduce the expense and size of the dryer section. It is estimated that if the water removed in the press section can be increased to decrease the moisture from 60 percent to 50 percent, the length of the dryer section can be reduced by ⅓. This is significant in a typical 3000 feet per minute newsprint machine which employs on the order of 100 dryer drums. This significance can be appreciated in considering that the dryer drums are each expensive to construct and to operate and require the provision of steam fittings and a supply of steam for each drum. The relative importance of the removal of water in the press section is further highlighted by the fact that one of the most important economic considerations in justifying a satisfactory return on investment in the operation of a paper making machine is to obtain the highest speed possible consistent with good paper formation and better pressing will shorten the necessary time in the dryer section and permit higher speeds.

It is accordingly an object of the present invention to provide an improvement in the press section of a paper machine which makes it possible to remove an increased amount of water in this press section and makes it possible to provide a press section having a relatively compact or shortened pressing area of a unique elongated or extended nature which does not have the performance limitations of conventional roll couple presses and which requires far less space in terms of requirements as to the overall length of the press section. By increasing the amount of water removed from the web in the press section, increased speeds are possible with existing equipment, i.e., a given length of dryer section can operate at higher speeds since it is required to remove less water. Also, new equipment can be constructed requiring less machine length and expense.

It is an object of the present invention to provide a press using a traveling belt wherein an improved structure is employed for applying the nip loading pressure to the belt.

A further object of the invention is to provide an improved pressing mechanism for a press which counteracts the disadvantageous effects of friction and provides a press which has a uniquely long operating life.

Another object of the invention is to provide a press mechanism wherein pressures at stages along the nip are more easily controlled than in structures heretofore available.

Another object of the invention is to provide a press which avoids the disadvantages of excessive leakage and the difficulty of providing large sliding seals as contrasted with prior art liquid pressure presses.

Other objects, advantages and features will become more apparent with the disclosure of the principles of the invention and as will be seen, equivalent structures and methods may be employed within the principles and scope of the invention as taught in connection with the description and disclosure of the specification, claims and drawings, in which:

DESCRIPTION OF THE DRAWINGS

FIG. 1 is a side elevational view shown in somewhat schematic form of a structure embodying the principles of the present invention; [and]

FIG. 2 is a fragmentary sectional view taken substantially along line II—II of FIG. 1[.]; *and*

DESCRIPTION OF THE PREFERRED EMBODIMENTS

Figure 3:
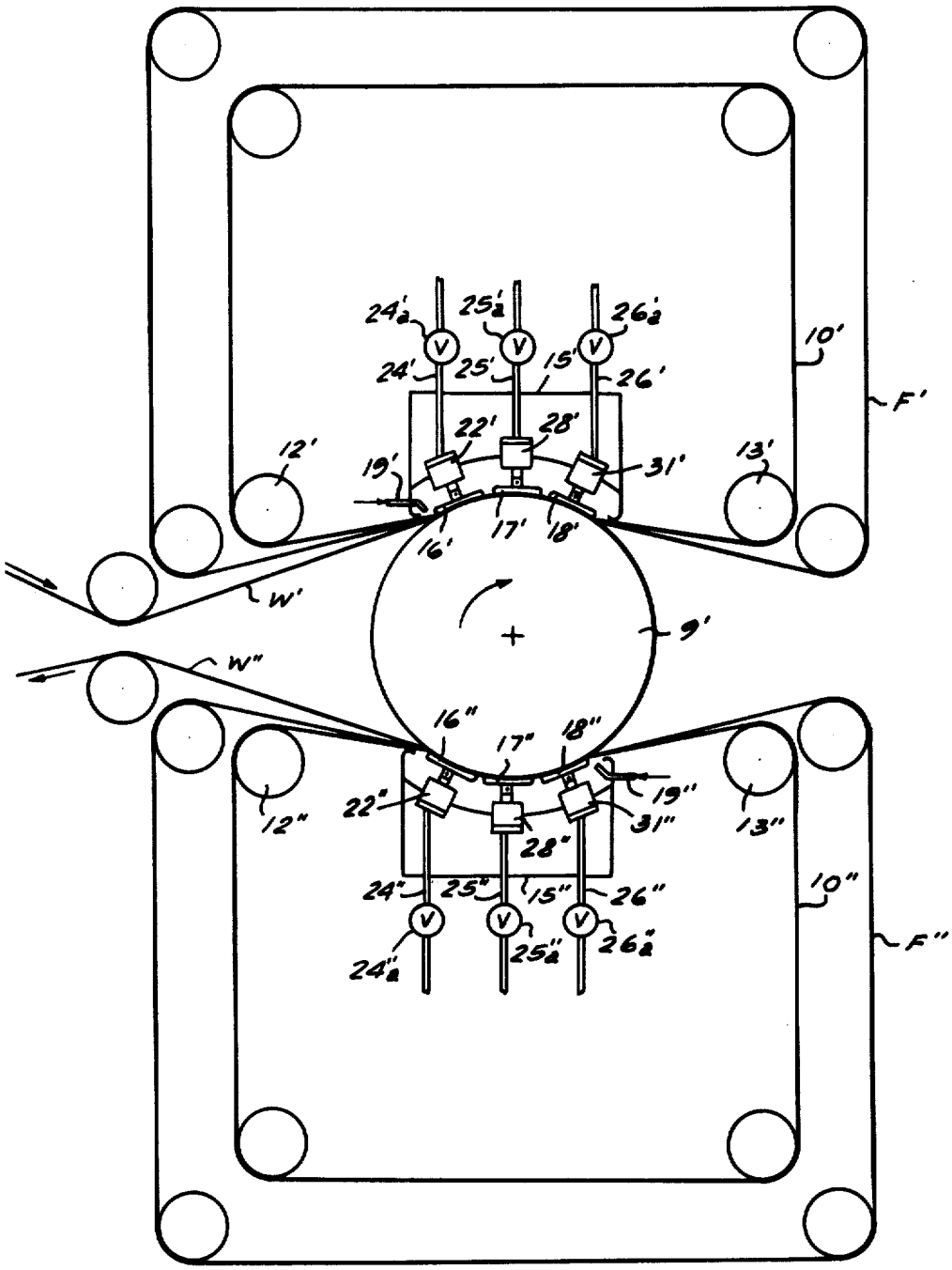
*FIG. 3 is a side elevational view shown in somewhat schematic form of an alternate structure.*

As illustrated in FIG. 1, a backing roll 9 is wrapped with a looped belt 10 to form an extended pressing nip. In operation, a continuous traveling web W is passed through the nip along with a felt F for receiving liquid pressed from the web. The belt 10 is carried on rolls 11, 12, 13 and 14.

Pressure in the nip is obtained from a series of sliding shoes 16, 17 and 18 which may be termed slipper bearing shoes and which have a smooth lower surface extending across the belt coextensive therewith with the surface also extending in the direction of the belt travel to apply pressure to the belt which pressure is transmitted to the web. Each of the shoes 16, 17 and 18 have a concave arcuately shaped lower surface with a relieved leading edge so as to form a wedge of lubricating fluid between them and the belt. For providing this lubricating fluid, a supply line 19 is provided to keep fluid within a housing 20 which has sliding seals against the belt to prevent the escape of lubricant which could result in the contamination of the web. Each of the shoes should have a radius of approximately the same as the roll and should be curved in such a direction so as to fit the roll. An objective is to get as much length of pressure as possible to form an extended pressing nip at each of the shoes.

The shoes are pivotally supported shown at 21, 27 and 30 *supporting the shoes and accommodating movement of each shoe about an axis parallel to the axis of the roll 9*. The shoes are somewhat flexible over their entire length and are backed by hydraulic fluid such as so that they exert a uniform pressure against the belt along their length thereby pressing water uniformly from the web along the length of the roll.

The pivotal supports 21, 27 and 30 may be in the form of a roll pin as shown in FIG. 2 which is supported from a piston 22 in a cylinder 23 containing a pressurized fluid. The piston 22 is sufficiently flexible over its length so that with the fluid in the cylinder 23 being at uniform pressure along the length of the cylinder in accordance with Pascal's law, the shoe 16 will exert uniform pressure along the length of the roll 9. This will occur even though the downward load on the roll 9 will cause downward bending thereof.

The support for each of the shoes is similar in construction and, therefore, only details for the first shoe 16 need be shown. The shoe 17 has its roll pin 27 carried on a piston 28 supported in a cylinder 29. Shoe 18 has its roll pin 30 supported on a piston 31 carried in a cylinder 32. Each of the cylinders are supported in an overhead support beam 15. This beam will also bend upwardly with a pressure in the cylinders 23, 29 and 32, but this will not affect the application of uniform pressure by the shoes to the belt.

If a relatively wide web is expected so that it is necessary to provide a long roll 9, anti-deflection means may be provided for the roll to prevent excessive bending. Such anti-deflection means may take various forms, and in one form the roll 9 will be a hollow roll shell with a stationary shaft extending therethrough. Fluid force transfer means will be located between the roll shell and the shaft to transfer the load from the shell to the shaft with the shaft bending downwardly relative to the roll shell, and the roll shell maintained substantially axially straight. The fluid force transmission means may take various forms such as that shown in the Justus Pat. 3,119,324.

As the web enters the nip, it is subjected first to the pressure applied by the shoe 16, and then subsequently to the pressure supplied by the shoe 17 and thereafter by the pressure applied to the shoe 18. Larger number of shoes may be provided. The shoes may be controlled to give sequentially increasing pressures to the web by pressurizing the chambers 23, 29 and 32 with sequentially greater pressures. In another form the same fluid pressure may be applied to each of the chambers, but the chambers may be of increasing width, so that the total pressure applied to the web through the shoes will increase. However, in a preferred form by positioning pressure control valves 24a, 25a and 26a in the lines 24, 25, and 26 leading to the cylinders 23, 29 and 32, controlled pressures may be applied. While the shoes are preferably of the same length, it is contemplated that different length shoes can be employed, such as by making the first shoe of longer length to obtain a reduced unit pressure in the first zone beneath the first shoe and successive increasing unit pressures in subsequent zones.

At the high speeds at which webs travel in current paper making machines, there is a limit to how much water can be removed at the location of the first shoe 16 inasmuch as hydraulic resistance pressures will build up within the web. In other words, as the pressure is applied very rapidly and suddenly, the water does not have adequate time to escape if the pressure applied is too high, so that a crushing or disturbance of the fibers will occur. Therefore, the pressure which is applied at the first shoe 16 is predetermined at a level so that maximum water removal will be attained without the hydraulic crushing of the web. The pressure which is applied to the next shoe 17 can be higher since some of the water will have been removed at the first shoe. Similarly, the pressure of the third shoe 18 can be still higher. This procedure is commonly followed in regular press nips where each subsequent nip applies a higher pressure. However, an advantage is obtained in the present arrangement in that a broader pressing area is employed, so that the water has more time to travel from the web into the felt. With a conventional press nip, the width of the nip is determined by the diameter of the press rolls, and this cannot be changed. By increasing the length of the shoe 19, the length of time that the web is subjected to the pressing pressure can be increased.

The present arrangement also provides an advantage over conventional press nips in that the pressure is applied hydraulically, that is, by virtue of the layer of lubricating fluid which is built up between the shoe 16 and the belt 10. This lubricating liquid has a pressure profile which builds up from the leading edge of the shoe and then drops off at the trailing edge of the shoe, but pressure extends along the full length of the shoe. This will result in improved application of pressure and improved water removal from the web as compared with the pressure profile which occurs to a web passing through the usual two roll press couple. Also, the need for web handling between subsequent press nips, as must be done in a conventional paper making machine employing the usual press couples, is eliminated since the web is under complete control from one shoe to the next. This eliminates web vibration and possible tear and, of course, greatly reduces the space requirements of a press section.

Another modification which may be made in the structure illustrated is that the roll 9 may be an open roll with circumferential surface grooves across its length, or may be in the form of a suction roll. In this arrangement the felt will be positioned against the roll and the web will be carried on top of the felt adjacent the belt.

It is also contemplated in some constructions that a pair of parallel belts may be employed with similar shoes positioned within the lower belt in opposing relation to the upper shoes. *An example of this structure is illustrated in FIG. 3, which has a rotatable roll 9', upper and lower looped flexible impervious belts 10' and 10'' respectively, which are wrapped over an upper and a lower*

*arc of the roll respectively and form a pressure nip for receiving and dewatering portions W' and W'' of the web which moves in the direction indicated by the arrowed lines wrapping the roll 9' between the pressure nips. Felts F' and F'' travel through the nips with the webs, and the upper press mechanism includes sliding shoes 16', 17' and 18' having an arcuately shaped concave smooth surface and extend transversely across the roll and have a controllable fluid pressure means 22', 28' and 31' respectively for the shoes, which are pivotally supported on the fluid pressure means. A spout means 19' is provided for providing a film of lubricating fluid between the shoes and the belt. The lower press portion has smooth arcuately shaped shoes 16'', 17'' and 18'' extending transversely along the roll, and these are in sliding engagement with the belt in a position at the side of the roll 9' opposite to the shoes 16', 17' and 18' and are in opposing relationship to the shoes 16', 17' and 18'. The shoes 16'', 17'' and 18'' are pressed toward the belt 10'' with a predetermined force by force means 22'', 18'' and 31'', which are essentially the same in construction as the force means 22', 28' and 31'. The mechanism for the upper and lower press portion assembly is substantially the same and is substantially the same as the mechanism of FIG. 1 and is numbered similarly and need not be described in detail. Means 19'' is provided for supplying a film of lubricating fluid between the shoes 16'', 17'' and 18'' and the belt 10''. There is linear tension in the belts 10' and 10'', and the structure includes means for providing this linear tension for increasing the force of the belt against the web to increase the dewatering pressure such as by a structure for adjusting the rolls 12' and 12'' outwardly as indicated schematically by the arrowed lines within the circles schematically indicating these rolls 12' and 12''. The structure may include a second felt F-2 which sandwiches the web between this second felt and the first felts F' and F'' so that the web is carried between the felts between the belt and roll. The roll 9' may be an open roll as indicated by the dotted lines 9'' on the roll.* This will eliminate the need for providing anti-deflection means for the lower roll, but because of the necessity of providing additional shoes and additional equipment, the illustrated arrangement is preferred.

It is further contemplated that a tension may be applied to the belt which will aid in the application of pressure to the web during its entire travel through the nip. This continuing pressure between the shoes may reduce rewetting, that is, return travel of the moisture from the felt to the web. It also may be desirable in some installations to utilize two felts with the web sandwiched therebetween, so that one felt passes against the belt and another felt passes against the cutter surface of the roll 9. The belt 10 will travel due to its contact with the felt and the driving forces of the roll, or in some instances, a separate drive for the belt may be employed to drive it at substantially the speed of the outer surface of the roll 9.

I claim as my invention:

1. A press mechanism for removing liquid from a traveling fibrous web comprising in combination, a press nip formed between first and second members for receiving a traveling web therebetween, one of said members being a traveling flexible impervious belt,

*the other of said members being a roll,* force means engaging the outer surface of said belt including a sliding shoe having a smooth surface facing the belt with said surface extending transversely, across the belt and also extending in the direction of belt travel with means for pressing the shoe toward the belt with a predetermined force,

*means for pivotally supporting said shoe about a pivotal axis extending transversely of the direction of belt travel,* means for providing a film of lubricating fluid between the shoe and the belt, the leading edge of said shoe being relieved to form a hydraulic wedge of lubricating fluid between the shoe and belt,

*said shoe surface being concave arcuately shaped so that a dewatering pressure extends along the full length of the shoe,* and means for receiving liquid pressed from the web between said members.

2. A press mechanism for removing liquid from a traveling fibrous web constructed in accordance with claim 1 and including [means for pivotally supporting said shoe about a pivotal axis extending transversely of the direction of belt travel] *a housing enclosing said shoe with seals between the belt and housing to prevent the escape of said lubricating fluid.*

3. A press mechanism for removing liquid from a traveling fibrous web constructed in accordance with claim 1 wherein the [other of said members is the outer surface of a rotatable] *radius of curvature of said shoe surface is substantially the same as said* roll.

4. A press mechanism for removing liquid from a traveling fibrous web constructed in accordance with claim 1 and including a plurality of sequentially located additional shoes in engagement with the outer surface of the belt each similarly constructed and providing additional areas of pressure.

5. A press mechanism for removing liquid from a traveling fibrous web constructed in accordance with claim 4 wherein each of the shoes is provided with a pivotal support and has a relieved leading edge shaped to form a wedge of lubricant between the shoe and the belt, and the structure includes an enclosure for retaining lubricating fluid for the shoes and enclosing said shoes.

6. A press mechanism for removing liquid from a traveling fibrous web constructed in accordance with claim 4 and including means for individually controlling the force applied to each of the shoes so sequentially increasing forces can be applied to the belt.

7. A press mechanism for removing liquid from a traveling fibrous web constructed in accordance with claim 4 wherein each of said shoes is provided with a fluid pressure means for forcing the shoe toward the belt.

8. A press mechanism for removing liquid from a traveling fibrous web constructed in accordance with claim 7 wherein said fluid pressure means includes a piston and cylinder and a controllable fluid pressure line leads to each of the cylinders for individually controlling the forces applied to the shoes to force them toward the belt.

9. A press mechanism for removing liquid from a traveling [fibrius] *fibrous* web comprising in combination, a rotatable roll, a looped flexible, impervious belt wrapped over an arc of the roll and forming a pressure nip therewith for receiving a traveling web, a felt traveling through the nip with the web, a plurality of *sequential* slipper bearing shoes *each* having a smooth lower surface extending transversely across the roll against the outer surface of the belt, means for delivering a lubricant between the belt and shoes, means for pivotally supporting the shoes with said shoes being arcuately concave shaped with a relieved leading edge to form a film of fluid therebetween so that the pressure on the belt is transmitted through the wedge of fluid formed between [the] *each* shoe and the belt, and controllable fluid pressure means for pressing the shoes toward the belt.

10. A press mechanism for removing liquid from a traveling fibrous web comprising in combination, a press nip formed between first and second members for receiving a traveling fibrous web therebetween, one of said members being a traveling flexible impervious belt, the other of said members being a cylindrical roll with the belt wrapped over an arc of the roll, force means engaging the outer surface of said belt including a sliding shoe having a concave surface *along the full length of the shoe so that a dewatering pressure extends along the full length of the concave surface, said surface being* of substantially the radius of said roll extending transversely and also in the direction of belt travel with means for pressing the shoe toward the belt,

*means supporting said shoe accommodating movement of the shoe about an axis parallel to the axis of the roll,* means for providing lubrication between the shoe and the belt, and means for receiving liquid pressed from the web between the roll and belt.

*11. A press mechanism for removing liquid from a traveling fibrous web constructed in accordance with claim 1 wherein said shoe is axially continuous for substantially the width of said belt.*

*12. A press mechanism for removing liquid from a traveling fibrous web constructed in accordance with claim 11 wherein said shoe is flexible over its entire length.*

*13. A press mechanism for removing liquid from a traveling fibrous web constructed in accordance with claim 11 wherein said means for pressing the shoe toward the belt includes a hydraulic fluid cylinder with a piston movable therein pivotally connected to the shoe with said cylinder and said piston being continuous for the width of the belt.*

*14. A press mechanism for removing liquid from a traveling fibrous web constructed in accordance with claim 13 wherein said piston is flexible over its entire length.*

*15. A press mechanism for removing liquid from a traveling fibrous web constructed in accordance with claim 1 including means for providing a linear tension in the belt for increasing the force of the belt against the web to increase the dewatering pressure.*

*16. A press mechanism for removing liquid from a traveling fibrous web constructed in accordance with claim 1 wherein said means for receiving liquid includes first and second felts arranged so that the web is carried between them between the belt and roll.*

*17. A press mechanism for removing liquid from a traveling fibrous web constructed in accordance with claim 1 including a second belt parallel to the first positioned to engage the opposite side of the roll to be in opposing relationship to the shoe,*

*and second force means engaging the outer surface of said second belt including a second sliding shoe having an arcuately shaped concave smooth surface facing the second belt with said surface extending transversely across the second belt and also extending in the direction of belt travel with means for pressing the second shoe toward the belt with a predetermined force and means for providing a film of lubricating fluid between the second shoe and the second belt with said second shoe surface being concave arcuate shaped so that a dewatering pressure extends along the full length of the second shoe.*

*18. A press mechanism for removing liquid from a traveling fibrous web constructed in accordance with claim 1 wherein said roll is an open roll with said means for receiving liquid pressed from the web being in the form of a felt and the web carried between the felt and the belt.*

*19. A press mechanism for removing liquid from a traveling fibrous web constructed in accordance with claim 9 wherein the first shoe is of longer length to obtain a reduced unit pressure between the belt and first shoe and then between the belt and a succeeding shoe.*

*20. A press mechanism for removing liquid from a traveling fibrous web constructed in accordance with claim 9 wherein said controllable fluid pressure means includes a hydraulic fluid pressure chamber with a piston pivotally connected to the shoe for each of the shoes with the chambers being of increasing width in the direction of belt movement so that the pressure applied to the web through the shoes increases.*

* * * * *